United States Patent [19]

Makhlouf et al.

[11] Patent Number: 4,639,492

[45] Date of Patent: Jan. 27, 1987

[54] PHENOLIC-MODIFIED ROSIN ESTERS

[75] Inventors: Joseph M. Makhlouf, Mars; Frederick A. Falk, Pittsburgh; Robert M. Piccirilli, Gibsonia, all of Pa.

[73] Assignee: PPG Industries, Inc., Pittsburgh, Pa.

[21] Appl. No.: 764,028

[22] Filed: Aug. 9, 1985

[51] Int. Cl.$^4$ .............................. C09F 1/04; C09F 7/08
[52] U.S. Cl. .................................. 525/54.42; 260/97; 260/103; 260/104
[58] Field of Search ............... 525/54.42, 133; 260/97, 260/103, 104

[56] References Cited

U.S. PATENT DOCUMENTS

| | | |
|---|---|---|
| 1,623,901 | 4/1927 | Amann et al. .................. 525/54.42 |
| 2,169,991 | 8/1939 | Rosenblum ...................... 525/54.42 |
| 2,400,718 | 5/1946 | Siegel ................................ 525/54.42 |
| 2,420,926 | 5/1947 | Anderson .......................... 260/99.5 |
| 2,730,511 | 1/1956 | Floyd ............................... 525/54.42 |
| 4,002,585 | 1/1977 | Oishi et al. ...................... 524/54.42 |
| 4,414,146 | 11/1983 | Olechowski et al. ................. 260/97 |

*Primary Examiner*—Herbert S. Cockeram
*Attorney, Agent, or Firm*—Godfried R. Akorli

[57] ABSTRACT

The present invention encompasses a phenolic-modified rosin ester which is derived from a rosin esterification product of a dimerized rosin and a phenolic resin. The phenolic-modified rosin esters, having a high softening point and good compatibility with hydrocarbon solvents and good gelability, are particularly suitable as binders for inks such as lithographic inks.

24 Claims, No Drawings

PHENOLIC-MODIFIED ROSIN ESTERS

BACKGROUND OF THE INVENTION

1. Field of the Invention

The present invention relates to modified rosins which are useful as binders in printing inks and coating compositions. More specifically, the present invention relates to phenolic-modified esters of rosins and their use in lithographic inks.

2. Brief Description of the Prior Art

Rosins have been generally disclosed for use as binders in inks. For this use, the desired properties of the modified rosins are, in the main, high softening point and good dilutability. Quite often, it has been found that one of these properties is improved at the expense of the other. The lack of this combination of properties in the modified rosins and other ink binders, for that matter, adversely affects the service requirements of inks as discussed hereinbelow.

Lithographic inks are used in printing processes that employ planographic plates to separate image from non-image area. The image areas are preferentially wet by ink, and the non-image areas are preferentially wet by water. During printing, the ink must remain sufficiently stable to transfer properly; yet the printed ink must rapidly dry to a solid.

Lithographic ink binders, which are of particular interest here, are selected on the basis that will ensure the above properties. For example, the working properties of the inks can be ensured by controlling the extent to which the ink, by virtue of its binder, and water interact to form a water-in-ink emulsion. The working and/or printing properties on the press at the prevailing press speed can be affected by this interaction. Generally, the ink must be sufficiently viscous in order to transfer without "flying-off". Yet, it must not be so tacky as to effect picking of the printed matter. Also, the printed ink must dry rapidly.

As can be seen from the foregoing, the selection or the preparation of ink ingredients, and in this case the ink binder, that will meet the above requirements is a difficult task. By this invention, one such type binder and inks formulated therewith are provided.

SUMMARY OF THE INVENTION

In accordance with the foregoing, there is described herein a basic invention and an improvement thereon. The basic invention encompasses a phenolic-modified rosin ester comprising a reaction product of:
(a) a rosin esterification product of:
   (i) an acid functional reactant comprising a rosin polyacid containing a dimerized rosin,
   (ii) an alcohol;
(b) a phenolic resin.

The phenolic-modified rosin esters of the invention preferably have a softening point greater than 110° C. and good solubility (alternately described herein aptly as dilutability) in hydrocarbon solvents.

The improvement thereon encompasses a phenolic-modified rosin ester comprising a reaction product of:
(a) a rosin esterification product of:
   (i) an acid functional reactant comprising a rosin polyacid containing a dimerized rosin,
   (ii) an unsaturated carboxylic acid or an equivalent thereof,
   (iii) an alcohol;
(b) a phenolic resin.

The instant phenolic-modified rosin esters preferably have a softening point greater than 110° C. and excellent dilutability in hydrocarbon solvents and distinctly good reactivity with gellants such as aluminum gellants.

The present invention further encompasses ink formulations comprising the phenolic-modified rosin esters of the basic invention and of the improvement thereon. The invention also encompasses processes for printing on substrates such as paper by applying the ink formulations to the surface of the substrates and drying the same. Printed matters obtained thereby are also encompassed by the invention.

It has been found that the ink formulations have excellent application properties, excellent press performance and quality printing. Printed inks derived therefrom have fast dry, high gloss, rub resistance and other desirable properties such as lack of piling on lithographic presses.

DETAILED DESCRIPTION OF THE INVENTION

The rosin esterification products useful herein can be prepared with an acid functional reactant described hereinbelow. The acid functional reactant useful herein comprises a rosin polyacid as described herein. In accordance with this invention, the rosin polyacid comprises at least two carboxyl groups. Typically, the rosin polyacid is obtained from rosins which are solid resinous materials derived from oleoresins or stump wood of pine trees. Rosins generally contain monoacid compounds which are typically abietic (carboxylic) acid and/or isomers thereof, as well as smaller amounts of non-acid compounds. The monoacid compounds of the rosins are herein referred to as rosin monoacids.

The rosin polyacids comprise dimerized rosins. The term dimerized rosin is used to refer to dimer acids of the afore-described rosin which can be prepared by the acid catalyzed reaction of the rosin. Illustratively, dimerized rosins can be prepared by "polymerizing" the rosin by the action of an alkyl or metal halide such as boron trifluoride or an inorganic acid such as sulfuric acid, at essentially room temperature over an extended period of time. The end result is a mixture comprising dimer acids of the rosin, the monoacid compounds, and the non-acid compounds. This mixture is also sometimes referred to in the art as "polymerized" rosins. Generally, these "polymerized" rosins comprise from about 20 to 60 percent of the dimerized rosin. The mixture can be further enriched in its dimerized rosin content by, say, removal of some of the rosin monoacid. Dimerized rosins or "polymerized" rosins are commercially available as DYMEREX and POLYPALE available from Hercules Inc. or SYLVATAC 140, 115, or 95, available from Sylvachem Co.

In accordance with this invention, the dimerized rosin is present in an amount sufficient to impart the necessary softening point to the instant phenolic-modified rosin ester without adversely affecting the dilutability thereof. Typically, the "dimerized" rosin is present in amounts of about 15 to 85 percent by weight based on the weight of the acid functional reactant. The amount of the dimerized rosin can be measured by gel permeation chromatography using, say, polystyrene standard by using the area of the dimerized rosin peak in relation to the total area under all the peaks of the chromatogram.

In measuring the weight percent dimerized rosin using the polystyrene as the standard, a Waters Associates gel permeation chromatograph Model 201 was used. Six μ-Styragel columns were used. Each column has the dimensions of 30 centimeters long and 7.8 millimeters inside diameter. A differential refractometer was used as detector, and the columns were arranged according to their pore size on the order of $10^6$-$10^5$-$10^4$-$10^3$-500-100 Angstroms with the $10^3$ Angstrom column being the first one. Tetrahydrofuran was used as a solvent with a flow rate of 2.0 milliliters/minute. The quality of the columns is checked by their "theoretical plate number" determined from orthodichlorobenzene and those columns with theoretical plate numbers greater than 3000/30 cm were used.

To determine weight percent dimerized rosin by gel permeation chromatography (GPC), the instrument is first calibrated using a polystyrene standard. Polystyrene standards used were purchased from Pressure Chemicals Company, Pittsburgh, Pa., and Waters Associates. The polystyrene standards have dispersities (dispersity=weight average molecular weight/number average molecular weight) ranging from 1.05 to 1.10. The weight average molecular weights of the polystyrene standards used were 900,000; 233,000; 50,000; 17,500; 4,000. To obtain a calibration curve, a set of 0.1 percent (10 milligram polystyrene/1.0 ml tetrahydrofuran) polystyrene solutions in tetrahydrofuran were prepared and a 0.25 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abssicca). A linear least squares plot of $\log_{10}$(molecular weight) versus elution volume in milliliters is used as a calibration curve. The lowest molecular weight of the polystyrene standard used was 4,000 and the calibration curve beyond that was extrapolated down to 100. The upper and lower exclusion limits of this set of columns are 5,000,000 and 100, respectively, in terms of polystyrene molecular weight. The sample whose dimerized rosin content is to be determined was prepared as a 1.0 percent tetrahydrofuran solution. After filtration through a 0.5 micron filter, available from Gehman Corporation, Catalog No. 4219, a 0.25 ml sample size was injected into the columns and a GPC chromatogram obtained under the same experimental conditions as the calibration.

Percent dimerized rosin =

$$\frac{\text{Area of dimerized rosin peak}}{\text{Sum of the area of all the peaks}} \times 100$$

The percent dimerized rosin calculated is based on the assumption that the same weight response is given for all the components of the "polymerized" rosin. The dimerized rosin peak typically appears at a polystyrene number of about 350–450. The rosin monoacid peak appears at about 150–200.

Rosin polyacids otherwise prepared which are of the nature of the afore-described dimerized rosin, can be employed in accordance with the invention and are intended to be encompassed hereby. Other acids can be employed in combination with the rosin acids. Illustratively, poly-basic acids such as dimer fatty acid; and yet others such as sebacic, isophthalic, adipic acids and the like can be employed. Other monoacids such as fatty acids can be employed. It is desired to point out that functional equivalents of the acids described hereinabove, where available and efficacious, can be employed as well. Non-limiting examples of the equivalents can be esters, anhydrides, chlorides and the like. It is also desired to point out that in effect the use of acids other than the rosin polyacids may modify some of the desirable properties such as softening point of the phenolic-modified rosin ester of the invention. Therefore, the skilled artisan should select the type and/or amount of the other acids accordingly.

The alcohol that is reacted with the acid functional reactant, in the preparation of the rosin esterification product, is tyically polyhydric alcohol. The high functional polyols are preferred. By high functional polyols is meant those polyols which will react with the acid functional reactants to produce rosin esters having high softening points and good dilutability with hydrocarbon solvents. Typically, the preferred polyols contain more than two hydroxyl groups. The polyol may contain substituents provided that the substituents do not adversely affect the reaction of the polyols or the performance of the resultant products, in accordance with this invention. Illustrative examples of these polyols are mono- or poly-pentaerythritol such as di- or tri-pentaerythritol. Yet other examples of the useful polyols are trimethylolpropane, trimethylolethane, glycerine and the like.

In the preparation of the esterification product, the particular reactants, reaction conditions and use will dictate the particular ratio of reactants. Typically, the equivalent ratio of the acid functional reactant to the polyol can be from about 0.8 to 1.2:1 and preferably 1.0 to 1.2:1. The reaction can be conducted at temperatures of 200° C. to 300° C. and preferably 250° C. to 300° C. until a desired acid value and/or hydroxyl value is attained. Lower temperature can be employed, but the rate of reaction will be slowed thereby. Also, higher temperature can be employed, but not above the point at which distillation of reactants or the final product will result. Solvents such as azeotropic solvents such as toluene or xylene or high boiling hydrocarbons can be employed. Catalysts such as condensation catalysts, e.g., dibutyltin oxide or butyl stannoic acid can also be employed in the reaction. The reaction can be conducted in a vessel properly equipped with, say, a thermometer, stirrer, and a distillation column to separate water that distills from reactants, and optionally a Dean Stark trap. The resultant ester of the polymerized rosin generally has a high softening point and good dilutability in appropriate hydrocarbon solvents.

Phenolic resins which are reacted with the rosin esterification product are known in the art. Illustratively, the phenolic resin is a phenol-formaldehyde reaction product such as an alkylated phenol formaldehyde, e.g., a para-tertiary butylphenol formaldehyde. The phenolic resins are employed in a weight ratio of about 1 to 15 percent and preferably from about 4 to 10 percent by weight based on the total weight of the reactants. Higher amounts can be employed provided that the excess does not adversely affect the desirable properties of the resultant product.

The resultant product of the rosin esterification product and the phenolic resin is described herein as the basic invention. In a particularly preferred embodiment of the basic invention as binders in inks, the resultant phenolic-modified rosin esters are characterized by high softening point, i.e., greater than 110° C., and good dilutability with hydrocarbon solvents. Softening point is measured by a temperature gradient heat bar method, as described hereinbelow. The phenolic-modified rosin esters are ground into a fine powder and then deposited on a heat bar (Type 7841 KOFLER HEIZBANK by Reichert, Austria) having a temperature range from 50° C. to 260° C. The powdered phenolic-modified rosin ester is deposited along the length of the bar, and ¼ inch in width. Softening point of the phenolic-modified rosin ester is the temperature at which there is a sharp change from non-tacky to a tacky fluid form. This softening point is approximately equal to the softening point one obtains by the so-called ring and ball method.

By good dilutability is meant that the resultant phenolic-modified rosin ester is highly compatible with hydrocarbon solvents such as "Magie Oils". A convenient method of testing dilutability of the phenolic-modified rosin ester is as follows. Ten grams of the rosin ester is dissolved in 6.6 grams of MAGIESOL-52 to give a clear solution at room temperature (25° C.). MAGIESOL-52 is then added with stirring in 5 milliliter increments. After each addition, the solution is allowed to stir for 10 minutes. The dilutability is registered by the amount of MAGIESOL-52 that is added before the solution turns from clear to hazy. The phenolic-modified rosin esters of this invention have excellent dilutability, in that it takes up to about 31-63 grams of MAGIESOL-52, or higher, before the solution turns from clear to hazy. Comparison with art-related hard resins which are useful as binders in ink formulations shows that said hard resins are significantly less dilutable in that it takes from about 6.6-13.3 grams of MAGIESOL-52 before solutions thereof turn hazy. Illustratively, PENTREX 833 and RESM 0247 which are hard resins available from Hercules Inc. as ink binders have dilutability of 6.6 and 13.3 grams. Also, LACROS 1400 and LACROS 1417 which are hard resins available from Sylvachem Co. as ink binders have dilutability of 6.6 grams.

In the improved invention, maleic anhydride or a functional equivalent thereof is additionally employed. It has been found that when maleic anhydride or a functional equivalent thereof is employed, there is obtained a marked improvement in gelability of the phenolic-modified rosin ester with aluminum gellants described below.

The maleic anhydride or an equivalent thereof can be added, in situ, during the preparation of the rosin esterification product. The maleic anhydride reacts with rosin in a Diels Alder fashion to produce what is referred to in the art as a maleinized rosin. This maleinized rosin enters into the polyesterification reaction with the polyol described above. The maleic anhydride is added in an amount sufficient to provide effective reactivity of the resultant composition with aluminum gellants. Typically, about 1.8 percent by weight based on the total weight of all the reactants is employed to provide satisfactory gelability without loss of other desirable properties such as gloss, transfer, solubility, dry time and tack stability. Generally, about 1.5 to 2 percent by weight of the maleic anhydride or a functional equivalent thereof can be employed. Other than maleic anhydride, compounds such as unsaturated carboxylic acid, preferably alpha, beta-unsaturated dicarboxylic acids or functional equivalents thereof, can be employed in accordance with this invention. Illustrative examples thereof are itaconic anhydride, maleic acid and itaconic acid.

In gelling the improved phenolic-modified rosin esters to provide a gelled varnish, gellants, preferably chemical gellants, are employed. Illustrative examples of the chemical gellants are aluminum alkoxylates such as methoxylated, ethoxylated or butoxylated aluminum derivatives. A specific but non-limiting example thereof is oxyaluminum octoate or aluminum isopropoxide. The gellants are employed in amounts sufficient to provide the ink with the proper rheology. If little or no gellant is added, inks made thereof will be ineffective on presses in that they would "fly-off" the press, i.e., mist excessively. If too much gellant is added, the ink would have excessive tack. This would result in paper picking. Typically, the amount of gellant ranges from about 1 to 5 percent and preferably 1 to 3 percent by weight based on the weight of the phenolic-modified rosin ester.

In the practice of this invention, the phenolic-modified rosin esters can be employed as the sole binder or in combination with other binders in ink formulations. It can be used in combination with pigments, solvents and other ink additives. The pigments useful herein can be carbon black, phthalocyanine blue, titanium dioxide, rubine reds, hansa yellow and the like. Yet other additives such as plasticizers, rheology modified and the like can be employed.

In printing, the inks display good transfer and stability in that they have desirably low tack and high viscosity. The printed inks dry rapidly and have excellent gloss, rub resistance, blocking and other desirable properties. In addition, the inks exhibit little or no piling which allows for long runs without shut downs for cleaning of blankets and plates.

The following are non-limiting examples which further illustrate the invention.

EXAMPLE 1

This example illustrates the phenolic-modified esters of polymerized rosins of this invention and a method of preparing same.

| Ingredients | Parts by Weight (grams) |
|---|---|
| Charge A | |
| SYLVAROS 20[1] | 1885 |
| SYLVATAC-140[2] | 1310 |
| Pentaerythritol | 326 |
| Butyl stannoic acid | 3.521 |
| Charge B | |
| Phenol formaldehyde CK1634[3] | 70.0 |

[1]Tall oil rosin available from Sylvachem Co.
[2]85% Rosin dimer, 15% monomeric rosin available from Sylvachem Co.
[3]Para-tertiary butylphenol formaldehyde resin available from Union Carbide Co.

Charge A was heated in an open kettle to a temperature of 290° C. and held thereat for about 7 hours until an acid value of about 14.3 was attained. The resultant product was discharged, cooled and analyzed with the following results. Final acid value was 17.7, softening point was 136° C. and Gardner-Holdt viscosity at 50 percent solids in MAGIESOL-52 was Y−.

Fourteen hundred (1400) grams of the above product was reacted with 70 grams of phenol formaldehyde as follows. The phenol formaldehyde was slowly added to the above product at 200° C. and held until the resultant mixture was clear at room temperature. The final product at 50 percent solids in MAGIESOL-52 had a Gardner-Holdt viscosity of Z4−, a softening point of 160° C. and dilutability of 63.

EXAMPLE 2

An ink formulation was prepared with the phenolic-modified rosin ester of this invention, as follows.

A heat set gel varnish was prepared from the resin which was essentially the same as described in Example 1. The resin was first converted to a 60 percent by weight solution in MAGIESOL-52 and will be referred to in the formula as "Resin Solution Example 1". The following were mixed together:

| Ingredients | Parts by Weight |
|---|---|
| Resin Solution Example 1 | 75 |
| Alkyd[1] | 11 |
| Polyamide[2] | 0.5 |

To the above solution was added the following:

| Ingredients | Parts by Weight |
|---|---|
| AIEM[3] | 1 |
| Gellant Solution[4] | 5 |
| MAGIESOL-47[5] | 8.5 | and the whole mixture mixed in a Waring Blender until 350° F. (177° C.) was attained in about 27 minutes. An additional 4 parts by weight of MAGIESOL-47 was added and the solution was cooled and allowed to stand overnight.

The resulting gelled varnish had the following characteristics:

| Laray Viscosity[6] | 430 poises |
|---|---|
| Yield Value | 20,000 dynes/cm$^2$ |
| 1 Minute Tack[7] | 15.5 @ 1200 rpm |
| Tack Stability | >10 minutes |

[1]Composition - 31.95 percent soya oil, 31.95 percent linseed oil, 10.65 percent trimethylolpropane, 1.76% glycerine, 23.65 percent isophthalic acid.
[2]Available from AZ Products as AZ Amide 215.
[3]Aluminum diisopropoxide acetoacetic ester chelate available from Chattem Chemical.
[4]33 Percent by weight in MAGIE 500-600 (From Magie Bros.) of oxyaluminum octoate (from Chattem Chemical).
[5]Available from Magie Bros.
[6]ASTM D-4040-81.
[7]ASTM D-4361-06.1.

A red heat set lithographic ink was prepared from the above gel varnish as follows:

| Ingredients | Parts by Weight |
|---|---|
| Gel Varnish | 51.5 |
| Wax Compound[1] | 8 |
| Flushed Red Pigment Base[2] | 30 |
| MAGIESOL-47 | 17.5 |

The above were mixed to give an ink with a tack of 10.9 at 1 minute. Prints made on 40 pound consolidated insert stock on the "Little Joe Proof Press" dried on SINVATROL drier had the following density and gloss:

| Print No. | Density[3] | Gloss[4] |
|---|---|---|
| 1 | 1.47 | 40.3 |
| 2 | 1.38 | 35.5 |
| 3 | 1.36 | 27.6 |
| 4 | 1.33 | 24.7 |
| 5 | 1.26 | 26.0 |
| 6 | 1.18 | 24.0 |

[1]A mixture of TEFLON and polyethylene waxes.
[2]Red flush base available from Sun Chemical D-19-2505.
[3]Optical Density - Cosar Smart Densitometer.
[4]60° Gloss - Gardner Glossmeter.

EXAMPLE 3

This example illustrates the improved phenolic-modified rosin ester of this invention and a method of preparing the same.

| Ingredients | Parts by Weight (grams) |
|---|---|
| Charge A | |
| UNITOL NCY[1] | 1728 |
| SYLVATAC-140 | 1201 |
| Pentaerythritol | 299 |
| Maleic anhydride | 58.1 |
| Butyl stannoic acid | 3.286 |
| MAGIESOL-52 | 365 |
| Charge B | |
| Phenol formaldehyde CK1634 | 158 |

[1]Tall oil rosin available from Union Camp Co.

Charge A was heated in a kettle equipped with a steam condenser and nitrogen blanket to a temperature of 290° C. and maintained thereat for about 9 hours until an acid value of 26.6 and a Gardner-Holdt viscosity of Y (in a 50 percent MAGIESOL-52) was attained. Thereafter, the reaction mixture was cooled to 200° C. The acid value at this stage was 23.7 and the Gardner-Holdt viscosity (in a 50 percent MAGIESOL-52) was Z+. Charge B was then added over a 15-minute period to the reaction mixture which was then held at 195°-200° C. for 1 hour, until an acid value of 26.4 and a viscosity of Z4+ (in 50 percent MAGIESOL-52) was attained. The resultant mixture was further thinned in MAGIESOL-47 to about 62 percent total solids and a viscosity of 50,000 centipoises.

The above phenolic-modified rosin ester was used in an ink formulation as follows:

EXAMPLE 4

An ink formulation was prepared with the phenolic-modified rosin ester of this invention, as follows.

A heat set gel varnish was prepared from the resin solution prepared in essentially the same manner as in Example 3. The following were mixed to form a homogeneous solution.

| Ingredients | Parts by Weight |
|---|---|
| Resin Solution Example 3 | 69 |
| Alkyd[1] | 11 |
| Polyamide[1] | 0.5 |

To the above solution was added the following:

| Ingredients | Parts by Weight |
|---|---|
| AIEM Solution[1] | 3 |
| Gellant Solution[1] | 4 | and the whole mixed in a Waring Blender until a temperature of 350° F. (177° C.) was attained in about 28 minutes. Then, 12.5 parts by weight of MAGIESOL-47 were added, mixed and the resulting varnish allowed to stand overnight at room temperature. The gelled varnish thus prepared had the following characteristics:

| Laray Viscosity[1] | 1000 poises |
| Yield Value | 14,500 dynes/cm² |
| 1 Minute Tack[1] | 16.7 @ 1200 rpm |
| Tack Stability | 10 minutes |

[1]Same as in Example 2.

A red heat set lithographic ink was prepared from the above gel varnish as follows:

| Ingredients | Parts by Weight |
|---|---|
| Gel Varnish | 52.5 |
| Wax Compound[1] | 8 |
| Flushed Red Pigment Base | 30 |
| MAGIESOL-47 | 9.5 |

The above were mixed to give an ink with a tack of 11.3 at 1 minute. Prints made on 40 pound consolidated insert stock on the "Little Joe Proof Press" and dried in a SINVATROL drier (380° F./20 feet per minute) had the following density and gloss:

| Print No. | Density[1] | Gloss[1] |
|---|---|---|
| 1 | 1.51 | 40.9 |
| 2 | 1.50 | 41.2 |
| 3 | 1.46 | 39.1 |
| 4 | 1.42 | 37.6 |
| 5 | 1.36 | 35.3 |
| 6 | 1.31 | 34.0 |
| 7 | 1.26 | 33.4 |

[1]Same as in Example 2.

Data from the foregoing and other examples are presented herein in a tabular form to illustrate the ratio of reactants and the effect thereof on the characteristics of the phenolic modified esters of polymerized rosins of this invention (and the precursors thereof). The method of preparation and evaluation of the phenolic modified esters of polymerized rosins are essentially the same as described in Example 1.

equivalents by those skilled in the art to which the invention pertains.

Therefore, what is claimed is:

1. A phenolic-modified rosin ester comprising:
   (a) a rosin esterification product of:
      (i) an acid functional reactant comprising a rosin polyacid containing a dimerized rosin, and
      (ii) an alcohol; reacted with
   (b) a phenolic resin.

2. A phenolic-modified rosin ester of claim 1, wherein the dimerized rosin is in an amount ranging from about 15 to 85 percent or higher based on the weight of the acid functional reactant.

3. A phenolic-modified rosin ester of claim 1, wherein the alcohol is a polyhydric alcohol.

4. A phenolic-modified rosin ester of claim 3, wherein the alcohol is pentaerythritol, trimethylolpropane or glycerine.

5. A phenolic-modified rosin ester of claim 1, wherein the phenolic resin is in an amount ranging from about 1 to 15 percent based on the total weight of the reactants.

6. A phenolic-modified rosin ester of claim 5, wherein the phenolic resin is in an amount ranging from about 4 to 10 percent.

7. A phenolic-modified rosin ester of claim 5, wherein the phenolic resin is a phenol-formaldehyde reaction product.

8. A phenolic-modified rosin ester of claim 7, wherein the phenol-formaldehyde reaction product is a para-tertiary butylphenol formaldehyde.

9. A phenolic-modified rosin ester of claim 1 having a softening point greater than 110° C. and good dilutability in hydrocarbon solvents.

10. An ink composition comprising as a binder a phenolic-modified rosin ester of claim 1.

11. A phenolic-modified rosin ester comprising:
    (a) a rosin esterification product of:
       (i) an acid functional reactant comprising a rosin polyacid containing a dimerized rosin,
       (ii) an unsaturated carboxylic acid or an equivalent thereof, and
       (iii) an alcohol; reacted with
    (b) a phenolic resin.

TABLE I[1]

| Entries | Rosin Dimer[2] | Rosin | Pentaerythritol | Phenol-Formaldehyde | Acid Value[3] | Softening Point[4] | Viscosity[5] | Dilutability[6] |
|---|---|---|---|---|---|---|---|---|
| 1 | 20.86 | 69.63 | 9.50 | — | 17.7 | 128 | X+ | — |
| 2 | 19.87 | 66.31 | 9.04 | 4.76 | — | 144 | Z5 | 42 |
| 3 | 18.96 | 63.30 | 8.63 | 9.09 | — | 166 | Z6 | 28 |
| 4 | 37.21 | 53.54 | 9.25 | — | 17.7 | 136 | Y− | — |
| 5 | 35.43 | 50.99 | 8.80 | 4.76 | — | 160 | Z4− | 63 |
| 6 | 33.83 | 48.67 | 8.40 | 9.09 | — | 169 | >Z6 | 31 |
| 7 | 53.16 | 37.80 | 9.04 | — | 16.9 | 162 | Z− | — |
| 8 | 50.62 | 36.00 | 8.61 | 4.76 | — | 170 | Z4+ | 62 |
| 9 | 48.33 | 34.36 | 8.22 | 9.09 | — | 192 | >Z6 | 55 |

[1]All entries are weight percentages. Entries 1, 4 and 7, respectively, are the precursors of the phenolic-modified rosin esters of entries 2 and 3; 5 and 6; 8 and 9.
[2]The rosin and rosin dimers are essentially the same as employed in the foregoing examples.
[3]mg KOH/gm resin.
[4]°C. as measured on Type 7841 KOFLER HEIZBANK GRADIENT temperatures bar.
[5]50% Total solids in MAGIESOL-52 available from Magie Bros.-Gardner Holdt.
[6]Grams of MAGIESOL-52 per 10 grams of resin to the cloud point.

While the illustrative embodiments of the invention have been described hereinabove with particularity, it will be understood that various modifications will be apparent to and can be readily made by those skilled in the art without departing from the scope or spirit of the invention. Accordingly, it is intended that claims directed to the invention be construed as encompassing all aspects of the invention which would be treated as 12. A phenolic-modified rosin ester of claim 11, wherein the dimerized rosin is in an amount ranging from about 15 to 85 percent by weight based on the weight of the acid functional reactant.

13. A phenolic-modified rosin ester of claim 11, wherein the unsaturated carboxylic acid is maleic anhydride.

14. A phenolic-modified rosin ester of claim 11, wherein the maleic anhydride is in an amount of 1.5 to 2 percent by weight based on the total weight of the reactants.

15. A phenolic-modified rosin ester of claim 11, wherein the alcohol is a polyhydric alcohol.

16. A phenolic-modified rosin ester of claim 15, wherein the alcohol is pentaerythritol, trimethylolpropane or glycerine.

17. A phenolic-modified rosin ester of claim 11, wherein the phenolic resin is in an amount ranging from about 1 to 15 percent based on the total weight of the reactants.

18. A phenolic-modified rosin ester of claim 17, wherein the phenolic resin is in an amount ranging from 4 to 10 percent.

19. A phenolic-modified rosin ester of claim 17, wherein the phenolic resin is a phenol-formaldehyde reaction product.

20. A phenolic-modified rosin ester of claim 19, wherein the phenol-formaldehyde reaction product is a para-tertiary butylphenol formaldehyde.

21. A phenolic-modified rosin ester of claim 11 having a softening point greater than 110° C. and good dilutability in hydrocarbon solvents and good gelability.

22. An ink composition comprising as a binder a phenolic-modified rosin ester of claim 11.

23. A substrate coated with the composition of claim 10.

24. A substrate coated with the composition of claim 22.

* * * * *